March 21, 1933. M. I. DORFAN 1,902,061
PNEUMATIC CLEANING AIR TREATMENT
Filed Dec. 4, 1929
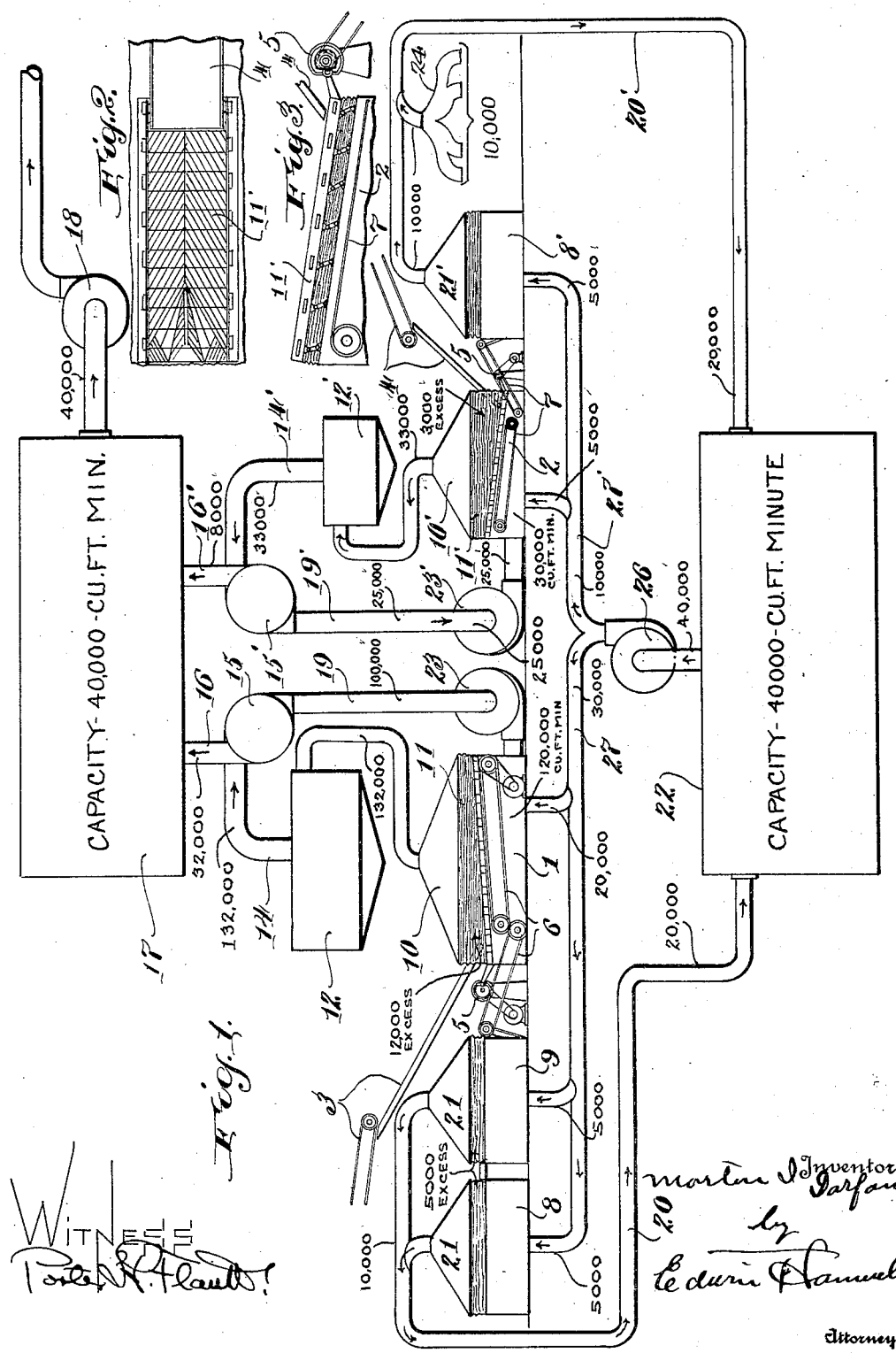

Patented Mar. 21, 1933

1,902,061

UNITED STATES PATENT OFFICE

MORTON I. DORFAN, OF HAGERSTOWN, MARYLAND, ASSIGNOR TO PANGBORN CORPORATION, OF HAGERSTOWN, MARYLAND, A CORPORATION OF MARYLAND

PNEUMATIC CLEANING AIR TREATMENT

Application filed December 4, 1929. Serial No. 411,430.

The invention relates to an air treatment method and apparatus which has been developed and is therefore illustrated in connection with the cleaning of coal, though it may be otherwise applied.

In cleaning coal pneumatically in accordance with the present practice, the volumes of air employed are such that the separation of the resulting dust from the air by means of the usual filtration type of dust collector, is too expensive to be practical, as such an air treatment or cleaning plant would cost more than the coal cleaning apparatus proper. The present plants include a stack of large cross section in which a portion of the dust is separated by settling and removed by chain conveyors or equivalent means. So much of the dust is released into the atmosphere, however, that buildings for a radius of a mile or more around the plant are dust coated and the vegetation is injured. Living conditions are further rendered unsanitary and disagreeable.

The object of the present invention is to provide a method and apparatus whereby the dust released from such plants is greatly reduced and the atmosphere within the plant purified. The method and apparatus of the invention when properly applied does in fact practically eliminate this difficulty.

In accordance with the invention the air released from the coal cleaning tables, after first being passed through a settling chamber or a cyclone dust collector or the like whereby a considerable proportion of the larger particles and some of the finer dust are removed, is skimmed or separated into two separate volumes, a relatively small volume of heavily dust laden air and a larger volume of comparatively pure air. These volumes in the preferred form may be proportioned approximately 1 to 3. The relatively small volume of dust laden air is then passed through an efficient dust collector of the filtration type and released into the atmosphere, the large volume of relatively pure air thus separated by skimming being returned to the coal cleaning apparatus and passed through and around the coal.

In this connection it should be understood that the coal treated in this way ordinarily carries a large quantity of moisture which is mostly removed by the cleaning air. This moisture is to a large degree separated in the skimmer from the main volume of air, being retained in and with the smaller volume of heavily dust laden atmosphere which is led to the dust arrester. The filtration of this small body of dust laden air and its subsequent release to the atmosphere completely disposes of the moisture so that there is no tendency to accumulate an excess of moisture in the apparatus, otherwise the air in the plant would become saturated.

In addition to the air thus supplied to the cleaning table, a considerable portion is drawn from the blow off boxes, elevator spills, conveyor spills, etc. and from all the miscellaneous dust sources around the plant. This air is drawn through a dust arrester of the cloth screen type and a portion of it is then applied to the tables where it is combined with the air from the skimmer and other portions of it are led to the blow off boxes.

In the accompanying drawing, Figure 1 illustrates diagrammatically an air treatment apparatus embodying the features of the invention in the preferred form, the illustration also including a diagrammatic showing of so much of a coal cleaning plant to which the air treatment apparatus of the invention is applied, as is believed to be necessary to a complete comprehension of the air treatment method and apparatus.

Figure 2 is a diagrammatic plan of a table.

Figure 3 is a side elevation of the same.

Referring to the drawing by numerals, each of which is used to indicate the same or similar parts in the different figures, the construction shown comprises two coal cleaning tables, i. e., a large table 1 and a small table 2, to which the coal to be cleaned is delivered in any suitable manner as by means of conveyors 3 and 4. These tables are reciprocated in the direction of their length in any suitable manner as by means of eccentrics or cams 5, which have the effect of moving the coal up the incline, the waste material being discharged at the sides by means of inclined riffles in accordance with the well known practice in the pneumatic cleaning of coal which is no part of the present invention. The waste material is then carried in any suitable manner as by means of conveyors 6, 7 to the blow off boxes 8, 9, and 8', where it is subjected to a further air treatment for the purpose of removing any of the coal which may have been carried away with the refuse.

In order to confine the air from the tables, each such table is covered with a canopy 10, 10', having depending curtains 11, 11', the canopy 10 being connected above to settling chambers or cyclone separator, 12, 12'. The separators 12, 12' are connected by pipes 14 and 14' to the skimmers 15, 15', whereby the air released from each table is divided into two separate volumes which in the practice herein outlined are related approximately in the proportions 1 to 3. The smaller volume carrying almost the entire content of solid particles and moisture contained in the discharge from the table, is led by pipes 16, 16' to a dust arrester plant of the cloth filtration type indicated by reference character 17 from which it is discharged into the atmosphere by means of a blower 18, which maintains or assists in maintaining the desired pressure and air velocity. The larger volume of air from which the bulk of the solid material and water has been separated by skimming is led by pipes 19, 19' to blowers 23, 23', by which this volume of air is returned beneath the tables 1 and 2, to be again used in the coal cleaning operation. A second volume of air to compensate for that discharged to the atmosphere from the air filter 17 is drawn from various sources which sources may include the elevator spills, conveyor spills and the blow off boxes and any other sources of dust around the plant as to which it is desired to purify the air and dispose of the accumulation of dust. The intake from these sources should preferably correspond closely to the amount of the discharge to the atmosphere from the dust collector 17. This air is drawn by way of pipe connections 20 and 20', leading from suitable canopies 21 and 21' over the blow off boxes 8, 9 and 8' to a dust arrester 22 of suitable capacity, which is also connected by pipes 20' to said elevator spills, conveyor spills, etc. the pipes leading from these respective sources being indicated at 24. The air from all these sources being drawn through the dust arrester 22 by means of a blower 26 of suitable capacity, is delivered by way of pipes 27 and 27' to the blow off boxes 21 and 21', and the tables 1 and 2 in suitable proportions. The quantities of air delivered and discharged at the various points in the particular plant which is used for example in the illustration of this application will be hereinafter related for illustrative purposes only and not with a view to limiting the method or apparatus to these particular proportions.

Referring again to the diagram, Figure 1 assuming for example that the large table 1 requires 120,000 cubic feet of air per minute while the small table 2 requires 30,000 cubic feet per minute. Allowing for 12,000 cubic feet per minute of excess air for the large table, which may be drawn in from the sides, the capacity of the settling chamber or separator 12 which receives the air from the table is 132,000 cubic feet per minute, and allowing 3,000 cubic feet of excess air for the small table, the capacity of the settling chamber 12', which receives the air from the small table, is 33,000 cubic feet per minute, the skimmer 15 which receives the air from the large table thus delivers 32,000 cubic feet of heavily dust laden air per minute to the dust arrester or air filter 17 and 100,000 cubic feet of relatively pure air per minute to the blower 23. The skimmer 15' which receives the 33,000 cubic feet of air per minute from the small table delivers 8,000 cubic feet of heavily dust laden air per minute to the dust arrester or filter 17 and 25,000 cubic feet per minute of relatively pure air to the blower 23'.

The heavily dust laden air from the tables delivered to the dust arresters or filters also contains the bulk of the moisture content of the entire volume received by the respective skimmers and in coal cleaning this moisture content is excessive. The blower 23 delivers the entire 100,000 cubic feet of relatively pure air per minute from skimmer 15 beneath the large table 1 and the blower 23' delivers the entire 25,000 cubic feet of relatively pure or skimmed air from skimmer 15' per minute beneath the small table 2.

Simultaneously with the operation above described, the blower 26 is drawing through the air filter or dust arrester 22, 40,000 cubic feet of air per minute taken from the blow off boxes 8, 9 and 8' and, or from the various dust sources about the plant where purification of the atmosphere is desired, as elevator spills, conveyor spills, etc. This pure filtered dry air returns to the tables and compensates partly for that discharged to the atmosphere from filter or dust arrester 17.

In accordance with the diagram, Figure 1, 10,000 cubic feet of this air is taken from the blow off boxes 8 and 9, which cooperate with the large table 1 and 10,000 cubic feet from the blow off box 8', and which cooperates with the small table 2. 5,000 cubic feet of this is indicated as excess air drawn in from the room. To compensate for the 40,000 cubic feet of air per minute, which is delivered to the atmosphere from the dust arrester or filter 17, an additional 10,000 cubic feet of air per minute is taken from the elevator spills, conveyor spills 24 and/or other dust sources about the plant where purification of the atmosphere is desired, or from sources of pure air which air may or may not be passed through the filter. It will be understood that all the air thus delivered to the filter or dust arrester 22 is preferably dry or comparatively so, the material in the blow off boxes having been already treated with air so that the bulk of the moisture has been removed. The other sources named are normally sources of dry air. This quantity of air purified by filtration in the separator or filter 22 is delivered by the blower 26 to the tables and blow off boxes, 20,000 cubic feet per minute being delivered beneath the table 1, 5,000 beneath the table 2, 5,000 to each of the blow off boxes 8 and 9 operatively connected to the table 1, and 5,000 cubic feet per minute to the blow off box 8'. In connection with the foregoing figures and deductions, it is necessary to bear in mind the fact that the figures given are purely illustrative and are quoted in round numbers, the various results being standardized to read in terms of thousands and tens of thousands of cubic feet, it being unnecessary to determine the exact volume of air delivered at any one time, the figures may be for purposes of illustration and comparison.

It will thus be apparent that in the practice of the improved method of purifying or cleaning air delivered to the coal cleaning tables and blow off boxes is first relieved of the heaviest particles as it comes from the table and then separated by skimming into two volumes comprising a small volume of heavily dust and moisture laden air and a large volume of pure air, the dust and moisture being further separated in the filter 17 and the air thus filtered discharged to the atmosphere and that the bulk of the air effectively if only partially purified dried by separation in the skimmer is returned to the tables being diluted at the tables with a new supply of air drawn from various sources around the plant which has been filtered to relieve it of suspended matter. By this combined process of separation, discharge, dilution and purification, a sufficient volume of reasonably pure dry air is supplied to the tables and blow off boxes, if any, continuously throughout the cleaning operation.

Important features of the invention are that the portion of the cleaning air which is discharged to the atmosphere is so separated from the main volume of the air as to carry with it the bulk of the moisture and solid particles which latter before the final discharge are separated in the filter and that the operation of this filter indicated at 17, is confined to the filtration of the heavily dust laden and moisture laden air separated in the skimmer from the main volume of air. As this air is discharged into the atmosphere, none of the condensed moisture which it carries is returned to the cleaning table. The moist dust laden atmosphere thus discharged and filtered to prevent contamination of the surrounding atmosphere is replaced and the entire body of air in use is diluted by dry pure air which is preferably taken from inside the building to give increased and uniform dryness. This prevents saturation of the air in the system with moisture, the precipitation of which would interfere seriously with the cleaning operation. By discharging the wet dust laden air and purifying it as it is discharged and replacing it with dry pure air the highest efficiency in the cleaning plant is attained, a considerable economy is effected by keeping the bulk of the air continuously in circulation and incidentally, the air within the plant is purified so as to greatly improve working conditions.

I have thus described specifically and in detail a process of treating air in connection with the cleaning of coal and other commodities by the air filtration method or by means of an air draft, the description being specific in detail in order that the method of operation and manner of applying the invention may be fully understood, however, the specific terms herein are used descriptively rather than in a limiting sense, the scope of the invention being defined in the claims.

What I claim as new and desire to secure by Letters Patent is:

1. The method of treating air in connection with cleaning coal and other materials by air flotation which consists in passing air through the material to be cleaned, the material being fed along a table for this purpose, separating a portion of the dust from the air by passing it through a settling chamber, skimming the entire volume of air from the table and thereby separating it into two volumes, one containing most of the suspended matter and the moisture, the other volume which is the larger one, being relatively pure, returning the pure air to the table where it is again passed through the material, filtering the dust laden volume of air and releasing it to the atmosphere withdrawing from other sources within the cleaning plant a quantity of air corresponding to that released, filtering it by a filtering operation separate from that first mentioned and delivering it to the table to be passed through the material to be cleaned together with the skimmed air.

2. The method of treating air used in the air cleaning of coal and corresponding materials which consists in supporting the material to be cleaned on a table and passing the air in cleaning contact with it, and further treating the waste from this cleaning step by means of blow off boxes, passing the air from the table through a preliminary separating step to remove a portion of the solid matter, then separating this air into two volumes by means of a skimmer, the bulk of the suspended matter being retained in one volume, the other volume being relatively pure, returning the volume of pure air to the table to be used in the further cleaning process, filtering the other volume and releasing it to the atmosphere and drawing from various dust sources, including the blow off boxes, a quantity of air corresponding to that released, filtering it and delivering a portion of it to the table to be combined with the volume of relatively pure air previously mentioned in this connection, and a portion of it to the blow off boxes to be passed in contact with the waste material and again returned for the second mentioned filtration step.

3. The method of treating air used in the air cleaning of coal and corresponding materials which consists in supporting the material to be cleaned on a table and passing the air in contact with it and further treating the waste from this cleaning step by means of blow off boxes, passing the air from the table through a preliminary separating step to remove a portion of the solid matter, then separating this air into two volumes by means of a skimmer, the bulk of the solid matter and moisture being retained in one volume, the other volume being relatively pure, returning the volume of pure air to the table to be used in the further cleaning process, filtering the other volume and releasing it to the atmosphere and drawing from various sources around the plant, including the blow off boxes, a quantity of dry air corresponding to that released, filtering it and delivering it to the table to be combined with the volume of relatively pure air previously mentioned in this connection, and a portion of it to the blow off boxes to be passed through the waste material and again returned for the second mentioned filtration step.

4. The method of treating air used in cleaning solids which consists of partially separating the dust, from the cleaning air, skimming the cleaning air, filtering and releasing the dust and moisture laden skimmed volume, passing the pure air from the skimmer in cleaning contact with the material, passing air from other dust sources through a separate cleaning apparatus and applying it to the material to be cleaned, thus combining it with the purer volume of air separated from the dust in the skimmer.

5. The combination in an air treatment system for use in connection with the pneumatic cleaning of coal or similar materials of means for subjecting the air from said cleaning process to an initial separating treatment and removing a portion of the suspended matter, means for skimming and thus separating the volume of air thus treated into two volumes, one of which contains the bulk of the suspended matter, means for filtering this volume of air, separating the sus- pended matter and for releasing it to the atmosphere after such treatment, means for returning the other volume of air to the pneumatic cleaning process, means for withdrawing a volume of dry air, corresponding to that released, from any convenient point of supply, means separate from the first mentioned filtering means for filtering this supply of dry air and leading it to the pneumatic cleaning process and combining it with the volume of air previously referred to as treated and skimmed.

6. The combination in an air treatment system by said apparatus including primary and secondary cleaning units for use in connection with the pneumatic cleaning of coal or other materials of means for subjecting the air from said cleaning process to an initial separating treatment, removing a portion of the suspended matter, means for skimming and thus separating the volume of air thus treated into two volumes, one of which contains the bulk of the suspended matter, means for filtering this volume of air, separating the suspended matter and for releasing it to the atmosphere after such treatment, means for returning the other volume of air to the pneumatic cleaning process, means for withdrawing a volume of dry air corresponding to that released from any convenient point of supply as elevator spills, conveyor spills, secondary cleaning apparatus and the like, means for filtering this supply of dry air and leading it to the pneumatic cleaning process and a portion of it to said secondary cleaning apparatus to perform a secondary cleaning process, and combining it with the volume of air previously referred to as treated and skimmed.

Signed by me at Hagerstown, Maryland, this 29th day of November, 1929.

MORTON I. DORFAN.